F. Bucknam,
Dish Drainer,
No. 63,361. Patented Apr. 2, 1867.
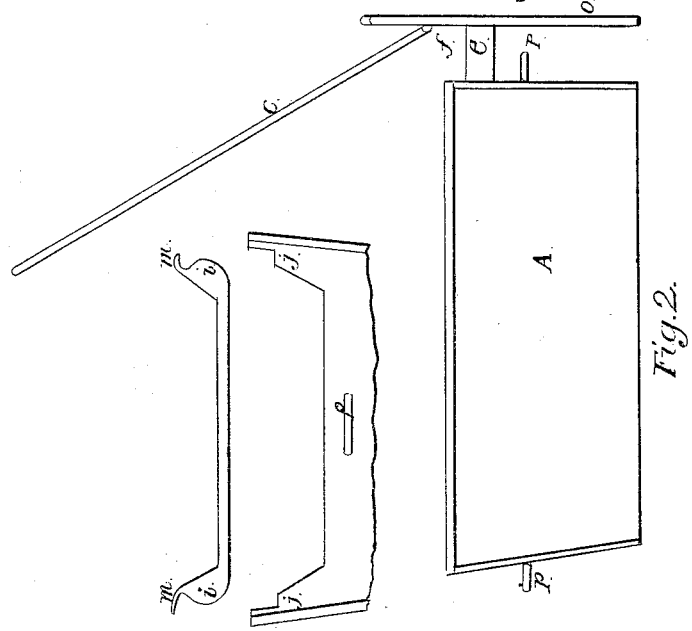
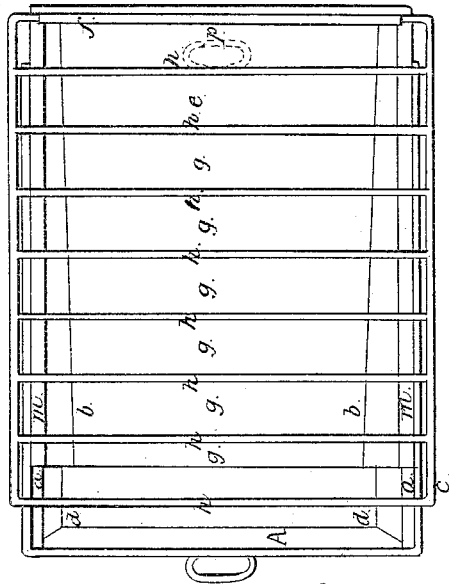

United States Patent Office.

FREDERIC BUCKNAM, OF PORTLAND, MAINE.

Letters Patent No. 63,361, dated April 2, 1867.

---

IMPROVED DISH-PAN AND DRAINER.

---

*The Schedule referred to in these Letters Patent and making part of the same.*

---

TO ALL WHOM IT MAY CONCERN:

Be it known that I, FREDERIC BUCKNAM, of Portland, in the county of Cumberland, and State of Maine, have invented a new and useful Dish-Washing Pan and Drainer; and I hereby declare the following to be a full, clear, and exact description thereof, which will enable others to make and use my invention, reference being had to the accompanying drawings, forming part of this specification, in which—

Figure 1 shows a top plan and a perspective of my invention.

Figure 2, a side view of the same.

Figure 3, an end view of the same.

My invention consists, first, of a pan, made rectangular in form, and represented at A, fig. 2, by a side view. Near the top of this, on a track, $a$, slides a drainer or cover, $e$, with an inclined bottom, $b$, and having a rack, $c$. In fig. 1, the drainer and rack are represented drawn somewhat off from the dish, so as to show the depth of the pan at $d$. The rack turns on a hinge at $f$, and can be raised, as seen in fig. 2. The drainer can be drawn completely off from the pan, so as to leave the pan wholly uncovered, for convenience in cleansing the dishes placed therein, and this is the manner in which the invention is intended to be used. The track $a$ runs the entire length of the sides of the pan, in order to allow the drainer to be drawn out, as before described. After the dishes have been cleansed in the pan A, they can be placed edgewise in the spaces $g$, between the cross-bars $h$, and thus allowed to drain, the water therefrom running down the inclined bottom $b$ of the drainer $e$ into the pan. When the drainer is drawn out so as to uncover the pan A, it is prevented from liability to slip free from the pan by means of the shoulder $i$ on the drainer and $j$ on the pan, the one lapping over the other. The end of the pan through which the drainer passes is cut down, as seen in fig. 3. The drainer has a lip, $m$, to rest and slide on the track $a$ of the pan. In use, the drainer is drawn out so as to uncover the pan, and, when thus drawn out, rests on its supports $o$. The pan is to contain the water. $p\ p$ show handles attached to the pan, by which it can be suspended when not in use. The rack $c$ is hinged, for convenience in cleansing and wiping the drainer.

What I claim as my invention, and desire to secure by Letters Patent, is—

The combination, with the pan A, constructed as described, of the slide-drainer $e$, having the rack $c$, all arranged and operating as and for the purposes set forth.

FREDERIC BUCKNAM.

Witnesses:
 WILLIAM HENRY CLIFFORD,
 HENRY C. HOUSTON.